Jan. 8, 1929.
L. STAUDENMEIR ET AL
1,698,321
APPARATUS FOR HANDLING FRAGILE ARTICLES
Filed Nov. 23, 1927   3 Sheets-Sheet 3
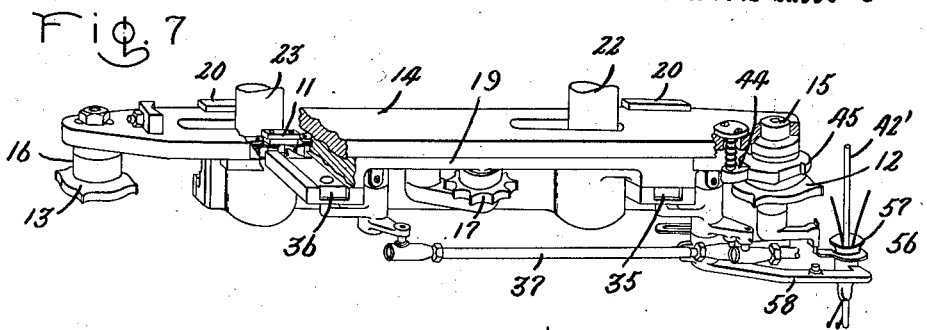
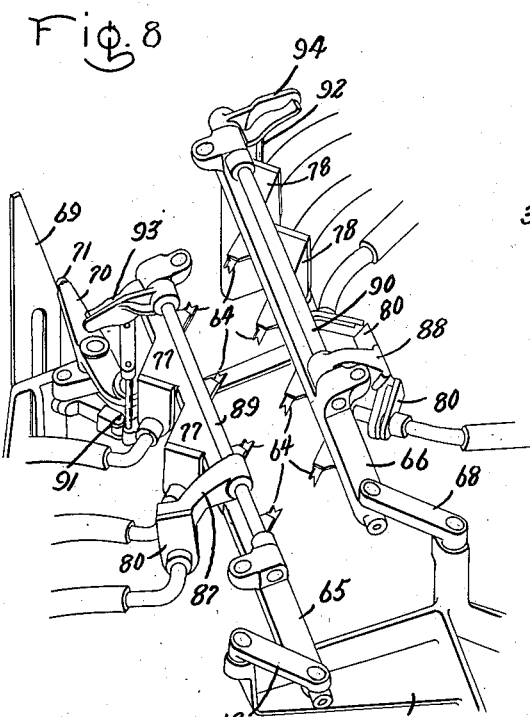
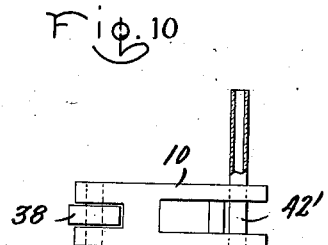
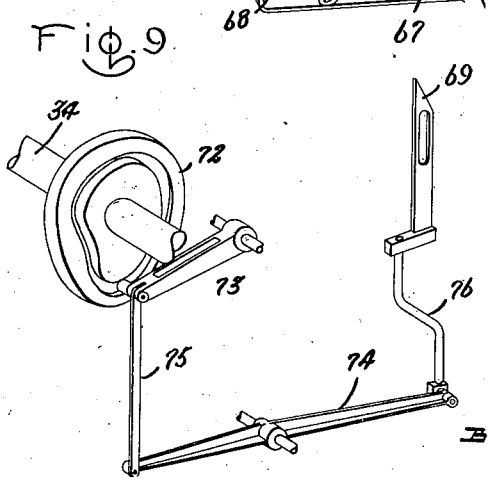
INVENTORS:
LUDWIG STAUDENMEIR,
ELMER B. ISAAC,
BY
THEIR ATTORNEY Patented Jan. 8, 1929.

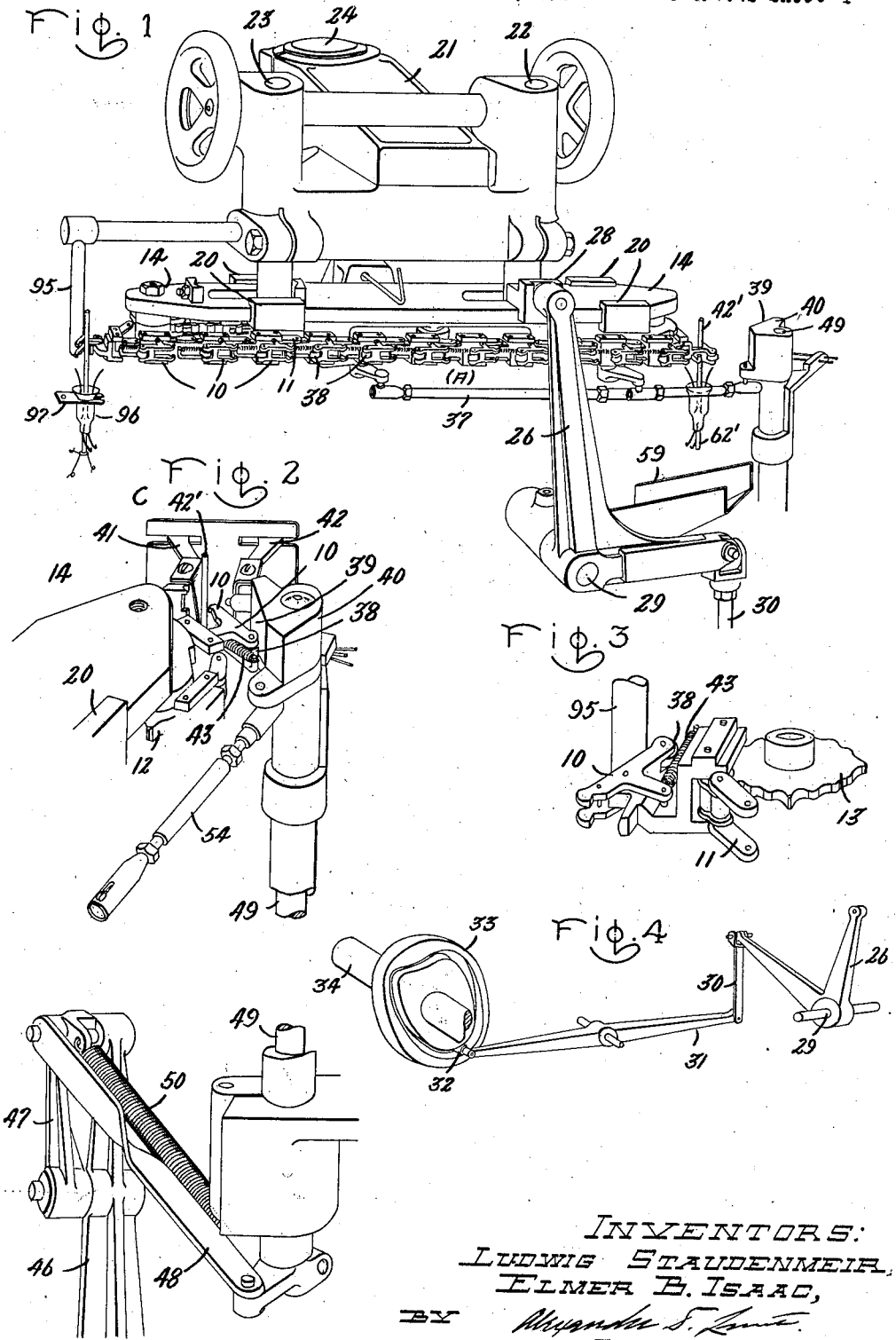

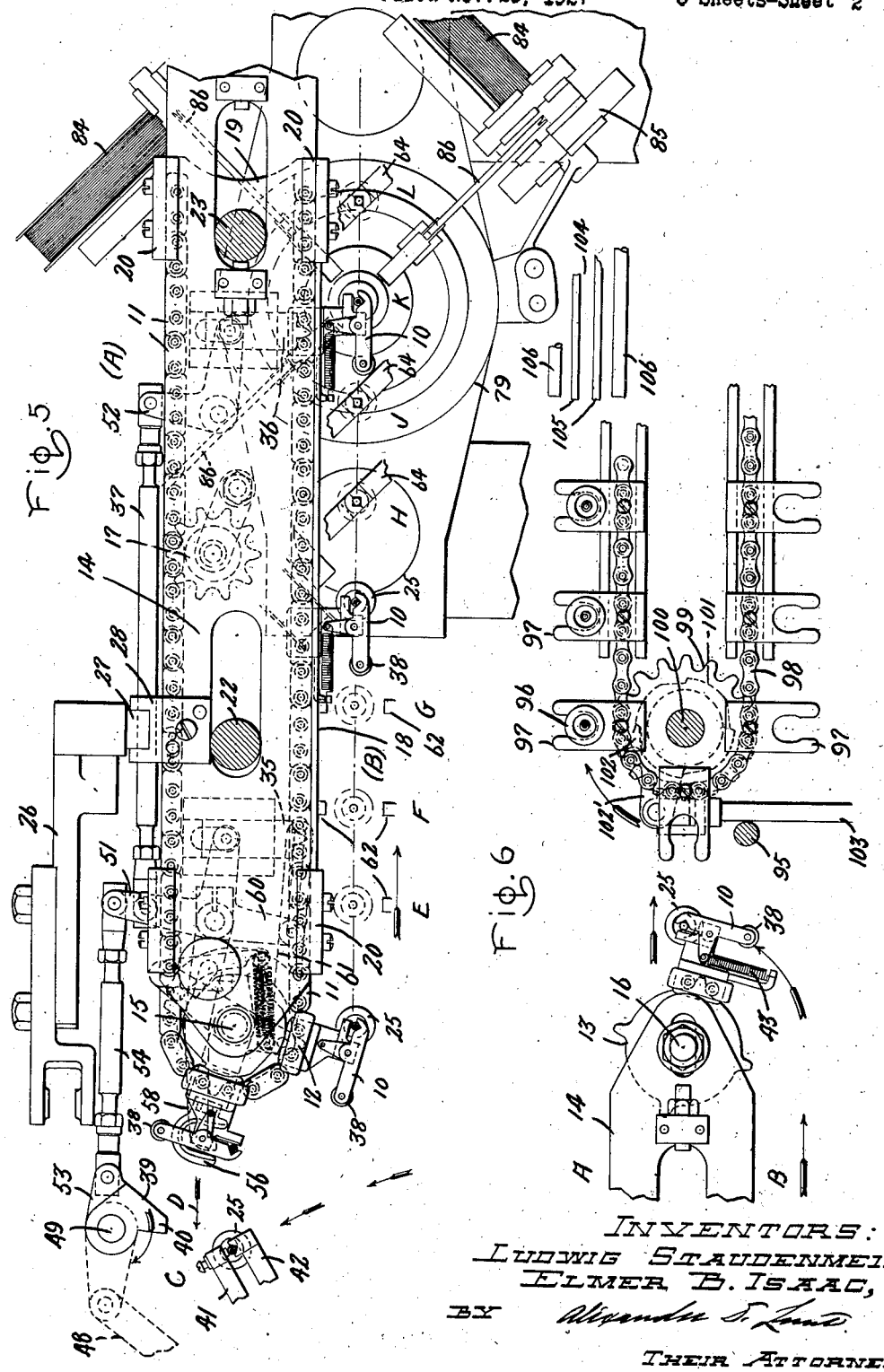

1,698,321

UNITED STATES PATENT OFFICE.

LUDWIG STAUDENMEIR AND ELMER B. ISAAC, OF CLEVELAND HEIGHTS, OHIO, ASSIGNORS TO GENERAL ELECTRIC COMPANY, A CORPORATION OF NEW YORK.

APPARATUS FOR HANDLING FRAGILE ARTICLES.

Application filed November 23, 1927. Serial No. 235,336.

Our invention relates to automatic glass working machinery and more particularly to devices for receiving fragile objects such, for example, as stems for incandescent lamps and similar articles, supporting them while one or more operations are performed on them, and finally delivering them at a suitable location for further operations.

Our invention may be used to advantage in connection with a stem making machine of the type disclosed in the application of Fagan and Staudenmeir, Serial No. 667,584, filed October 9, 1923. This machine comprises an intermittently rotating turret having mounted thereon a number of similar heads, each head comprising a number of chucks adapted to receive the parts necessary for making an electric incandescent lamp stem. After a head has received all of the necessary parts and they have been properly positioned, it continues to advance intermittently around the machine and encounters various agencies which cause the fusion of portions of the assembled parts, the clamping of the fused portion to form a seal, and the blowing of a passage through the clamped portion communicating with the exhaust tube. The stems as completed on the said machine are removed to another machine for inserting a number of filament support wires thereinto. The practice heretofore has been to transfer the stems by means of a swinging arm adapted to grip and remove one stem at a time from the discharge position of the stem machine to the support wire inserting machine for completion.

According to our invention we provide a novel transfer mechanism comprising a plurality of chuck jaws linked together to form an endless chain. The arrangement of the transfer mechanism is such that as one of the stem heads arrives at the unloading position, a pair of chuck jaws are advanced toward the stem machine and automatically opened so as to be in position to grip the partly completed stem at the proper time. The stem is then carried past a number of fires which fuse the lower portion of the arbor preparatory to forming a button thereon. At a certain point in the travel of the stem, this button is formed and a number of support wires inserted therein. The completed stem is then automatically unloaded onto an endless conveyor chain which carries it through an annealing oven to a mounting operator who removes the stem and mounts the filament thereon. This invention adapts itself to comparatively high speed production with minimum shrinkage and supervision. One important advantage of our invention is that it is considerably speedier in operation than prior devices. Various other advantages will appear from a more detailed description which follows.

The invention will best be understood in connection with the accompanying drawings in which Fig. 1 is a perspective view of our improved transfer mechanism; Fig. 2 is a fragmentary perspective of the receiving end of the transfer mechanism with a pair of its carrying jaws being opened so as to receive a lamp stem from one of the heads forming part of an automatic stem making machine; Fig. 3 is a fragmentary perspective showing one of the chucks and the opening means therefor at the delivering end of the transfer mechanism; Fig. 4 shows the driving cam and levers which operate the transfer mechanism and cause it to move back and forth; Fig. 5 is a fragmentary plan of the transfer mechanism partially in section; Fig. 6 is a continuation of Fig. 5 showing the delivering end of the transfer mechanism and a portion of the finished stem conveyor; Fig. 7 is a fragmentary perspective of the transfer mechanism with certain parts omitted for clearness; Fig. 8 is a perspective view of the arbor centering and locating mechanism; Fig. 9 is a perspective of the driving cam and levers which operate the arbor centering mechanism; Fig. 10 is a fragmentary elevation of a lamp stem in the process of having a button formed on the end of the arbor and its support wires inserted therein.

Referring now to the drawings, the transfer mechanism comprises a number of chucks 10 mounted on roller chain links 11 to form an endless chain. This chain is carried on the sprockets 12 and 13 mounted at each end of a plate 14 on the short shafts 15—16. The idle side (A) of the chain is supported midway between its ends by an idler sprocket 17 while the working side (B) of the chain is kept true by the guide plate 18 carried by plate 14 and with which the chain contacts. The plate 14 is slidably mounted upon the face of a bracket 19 and adapted to slide through guides 20 forming part of the bracket 19 which in turn is adjustably supported from the standard 21 through the vertical shafts 22 and 23. The standard 21 is mounted upon the stem machine bed plate (not shown) through a post 24.

As the stem 25, at the end of its travel around the stem machine reaches the unloading position indicated as C, Figs. 2 and 4, the plate 14 is moved forward in the direction of the arrow D (Fig. 5) so as to place one of the chucks 10 in position to receive the stem. The reciprocating motion of the plate 14 is caused by a bell crank 26 whose roller 27 fits into a lug 28 fastened to the said plate. As shown in Fig. 4, the bell crank is fulcrumed at 29 and operated through the levers 30, 31 and roller 32 which rides in the slotted cam 33 carried on the main cam shaft 34 of the stem machine. Prior to moving the plate 14 in the direction of the arrow D, a pair of latches 35 and 36 slidably mounted in bracket 19 and operated simultaneously through connecting rod 37 are caused to enter two links 11 of the roller chain in order that the working portion B of the chain may be held rigid thus preventing any movement of those chucks which have already received and are now holding stems for further operations. While these chucks are held stationary, the plate 14 goes forward causing the sprockets 12 and 13 to rotate with the free portion of the chain which at its receiving end advances one chuck to a point near the unloading position of the stem machine where it may conveniently grasp a stem, at the same time rotating one of the chucks at its delivering end into position so that it may dispose of its finished stem on the return movement of the plate 14. As shown in Fig. 2, the chuck 10 is opened to receive the stem through a roller 38 which contacts with the face 39 of a movable cam 40 as the chuck advances toward the stem head. At this time the exhaust tube holding jaws 41—42 of the stem head are slightly opened to allow the chuck to grip and hold the exhaust tube before it is released by the other stem head jaws. At the proper time roller 38 is released by a clockwise rotation of the cam 40 which causes the chuck jaw to close about the exhaust tube 42′ through the action of spring 43 whereupon the remaining stem head holding jaws are opened to release the stem. The plate 14 is then moved backward so as to carry the new stem away from the stem machine and rotate it in a counter clockwise direction around to the straight working side (B) of the chuck chain. During this time the latches 35 and 36 are withdrawn from the roller links 11 unlocking the chuck chain so that it moves as a unit with the plate thus indexing the series of stems held thereby. The sprockets 12 and 13 are prevented from rotating at this time by a pawl 44 mounted on plate 14 and acting on a ratchet 45 mounted on the shaft 15 located at the receiving end of the plate 14.

The chuck opening cam 40 is operated simultaneously with and by the same cam that opens the stem head jaws. The chuck is caused to grip the stem before it is released by the stem head jaws due to the fact that a small amount of movement suffices to close the chuck while a much greater movement is required to open all the stem head jaws. The chuck opening cam 40 is connected to the stem head jaw opening cam (not shown) through levers 46—47, link 48 and shaft 49. Spring 50 takes up the excess motion of lever 46 (Fig. 2) so as to prevent injury to the various parts. The latches 35 and 36 are operated through bell cranks 51 and 52 connected to a lug 53 carried on shaft 49 through operating rods 54 and 37.

Stems reaching the unloading position having broken or missing exhaust tubes are removed from the stem machine by a hook-shaped arm 56 which rotates under the flange portion of the flare tube 57 during the forward movement of the plate 14 as shown in Figs. 5 and 7. As the plate 14 recedes the arm 56 carries the damaged stem away from the stem machine rotating slightly to the right (Fig. 5) causing the flare tube to contact with a stripper arm 58 which pushes the said tube out of the hooked arm 56 and onto the chute 59 (Fig. 1). The rotating of the arm 56 is accomplished through an extension 60 of bell crank 51 which operates the arm 56 through connecting link 61.

The newly loaded stem passes to the working side of the apparatus and its holding chuck 10 contacts with the guide plate 18 (Fig. 5). At positions E, F, and G, fire from the stationary burners 62 is applied to the stem for annealing purposes. At positions H, J, K and L, the arbor 62′ forming part of the stem 25 is accurately located and centered and rigidly held by notched jaws 64. As shown in Fig. 8, these jaws are in open position during the stem indexing period, but while the stem is stationary, the jaws are together as shown in Fig. 5. These centering jaws are carried by two parallel bars 65—66 which approach and recede from each other. The bars are pivotally mounted on bracket 67 through connecting links 68 and actuated through the vertical movements of a plate cam 69 which operates lever arm 70 through its roller 71. The plate cam 69 is in turn operated from the main cam shaft 34 through slotted cam 72, levers 73—74 and connecting rods 75—76 as shown in Fig. 8. Heat is applied to the end portion of the arbor at positions H and J from the opposed burners 77 and 78 in order that the end of the arbor may become plastic preparatory to forming a button thereon.

At position K is located a filament support wire inserting machine 79 of a type which has been in use for a number of years. This machine may be mounted upon the stem machine bed plate and operated through a series of cams (not shown) carried by the main cam shaft 34. While the stem is at position K, the lower portion of the arbor 42′ is again heated by flames from the burners 80, there being three such burners at this position which complete the heating operation. The button 81 is next formed by a reciprocating rod 82 which is caused to contact with the end of the arbor tube so as to upset the plastic glass as shown in Fig. 10. After the button forming operation has been completed, wire supports 83 which have been formed and cut off from the spools 84 are transferred from the forming mechanism 85 and inserted into the hot glass button by the conveying fingers 86. In order to avoid oxidation of the wire supports 83, the fires are moved away before the button is formed. This is accomplished by rotating the burner arms 87 and 88 pinned to shafts 89 and 90, said shafts being rotated by the push rods 91—92 which contact with arms 93—94 carried by said shafts.

The stem is next indexed through a number of positions eventually reaching the end of the chuck chain as shown in Fig. 6. Upon the backward movement of the plate 14 the chuck roller 38 strikes against an adjustable post 95 thereby opening the chuck 10 and allowing the completed stem 96 (Fig. 1) to drop into one of the stem holders 97 carried by a conveyor chain 98. The plate 14 remains in the backward position long enough to allow the stem conveyor chain to index in the direction of the arrow (Fig. 6) so as to carry the stem sideways out of the open jaws of the chuck 10. The plate again moves forward allowing the chuck to close through the action of its spring and at the same time bringing another finished stem into position ready for unloading on the return movement of the plate 14.

The endless stem conveyor chain 98 carries a number of holders 97 and is driven through sprocket wheel 99 mounted upon the upper end of shaft 100. Intermittent motion is transmitted to the shaft 100 by a ratchet 101 mounted thereon, said ratchet being rotated by a pawl 102 mounted on lever 102′ carried on the end of rod 103. The rod in turn gets its motion from a cam (not shown) mounted on the main cam shaft 34.

After travelling a number of positions in the open, the stems enter an annealing oven 104 having elements 105 heated by gas jets 106, as shown in Fig. 6. After passing through the oven the stems travel some distance until properly cooled after which they are removed by the operator who mounts the filaments thereon.

What we claim as new and desire to secure by Letters Patent of the United States, is:

1. The combination of an endless chain carrying a series of chucks, indexing means for said chain, a source of supply of glass stems disposed adjacent to the path of travel of said chucks, means also disposed adjacent to the path of travel of said chucks for performing an operation on said stems, means for holding a portion of said chain stationary during said operation, means for moving the free portion of said chain to bring one of said chucks into position to receive a stem from said source of supply thereof and means whereby the aforesaid means are caused to operate in proper sequence.

2. The combination of an endless chain, chucks carried thereby, means for holding a portion of said chain stationary, means for moving the remaining portion of said chain relatively to said held portion and means whereby the aforesaid means are caused to operate substantially simultaneously.

3. The combination of an endless chain carrying a series of stem holders, means for indexing said holders past a support inserting apparatus, a steadying means mounted so as to engage a portion of each stem during the inserting operation, and means for causing the aforesaid means to operate in proper sequence.

4. The combination of an endless chain carrying a series of chucks, means for indexing said chain, a source of supply of stems disposed adjacent to the path of travel of said chucks, a discharge conveyor also disposed adjacent to said path of travel, means for opening said chucks to receive stems from said source, means for also opening said chucks to deliver said stems to said conveyor and means whereby the aforesaid means are caused to operate in proper sequence.

5. The combination of a substantially horizontally disposed endless chain carrying a series of chucks each adapted to receive and support a substantially vertically disposed stem by engagement with a projecting member thereof, a source of supply of such stems, means of actuating said chucks successively to open and close around one of said projecting members and co-acting means for removing from the path of travel of said chucks imperfect stems having such members absent or incomplete.

6. The combination of an endless chain carrying chucks each adapted to support a stem, means for indexing said chain, a source of supply of stems disposed adjacent to the path of travel of said chucks, a support inserting means located below and adjacent to the path of travel of said chucks, means for causing the latter to operate while the said chain is stationary and means for substantially simultaneously causing the opening of a chuck adjacent to said source of supply to receive a stem therefrom.

In witness whereof, we have hereunto set our hands this 19th day of November, 1927.

LUDWIG STAUDENMEIR.
ELMER B. ISAAC.